United States Patent [19]

Campbell et al.

[11] 4,090,639
[45] May 23, 1978

[54] MULTIPLE DOSE PASTE DISPENSER

[75] Inventors: James A. Campbell, West Chester; R. Richard Unangst, Havertown, both of Pa.

[73] Assignee: SmithKline Corporation, Philadelphia, Pa.

[21] Appl. No.: 768,264

[22] Filed: Feb. 14, 1977

[51] Int. Cl.² .............................................. G01F 11/06
[52] U.S. Cl. ................................. 222/43; 128/218 C; 222/309; 222/326; 222/391
[58] Field of Search ................. 222/43, 309, 326, 327, 222/391; 128/218 C, 218 PA

[56] References Cited

U.S. PATENT DOCUMENTS

| | | | |
|---|---|---|---|
| 2,530,359 | 11/1950 | Peterson | 222/327 X |
| 2,582,156 | 1/1952 | Peterson | 222/327 |
| 2,602,570 | 7/1952 | Sherbondy | 222/327 |
| 2,605,763 | 8/1952 | Smoot | 222/43 X |
| 2,732,102 | 1/1956 | Ekins | 222/327 |
| 3,517,668 | 6/1970 | Brickson | 222/391 X |
| 3,894,663 | 7/1975 | Carhart et al. | 222/309 |
| 3,907,166 | 9/1975 | Bassignani | 222/284 X |

Primary Examiner—Robert B. Reeves
Assistant Examiner—Fred A. Silverberg
Attorney, Agent, or Firm—Smith, Harding, Earley & Follmer

[57] ABSTRACT

A multiple dose paste dispenser has a frame with a handle secured thereto. A piston rod having a piston on the front end is mounted in said frame for longitudinal movement. A cartridge is secured to the frame in alignment with the piston. A gripping ring is slidable along said rod and grippably engages the rod when it is tilted with respect to the rod. A return spring urges the ring in a direction away from the piston. A trigger pivotally mounted on the frame is adapted to tilt the ring and advance the ring, the rod and the piston into the cartridge. A stop is pivoted to the frame for movement from an inoperative position to a position for limiting the advance of the ring. Advantageously the stop is stepped to provide for at least two different stop positions.

5 Claims, 4 Drawing Figures

MULTIPLE DOSE PASTE DISPENSER

BACKGROUND OF THE INVENTION

Multiple dose paste dispensers of the type disclosed herein are known to the prior art with the exception of the stop mechanism of the invention (see, for example, U.S. Pat. No. 3,894,663, issued July 15, 1975, which is incorporated herein by reference). For the state of the prior art, reference may also be had to the references cited in said U.S. Pat. No. 3,894,663. Such dispensers have heretofore been provided with stop mechanisms to permit the repeated delivery of any one of a number of doses depending upon, for example, the size of the animal when used for veterinary purposes. The heretofore known stop mechanisms have been unsatisfactory because of numerous factors. For example, the multiple opening-pin type disclosed in U.S. Pat. No. 3,894,663 is awkward to operate and unreliable since the pin is easily dislodged. The screw type stops disclosed in the same patent are difficult to set to the different predetermined doses. The stop of this invention has solved these problems by virtue of being very easy to set and very reliable. Further, the design of the stop provides greater flexibility in the number of different doses that can be provided for as contrasted to the prior art pin type stop.

BRIEF SUMMARY OF THE INVENTION

A multiple dose paste dispenser of the type employing a piston rod which is advanced by a trigger tilting a ring on the rod with the ring being returned to a fixed position in a non-tilted orientation by a spring is provided with a pivoted stop movable to a plurality of positions to provide for a plurality of stop positions limiting the advance of the ring. Advantageously the stop is stepped to provide for a plurality of different stop positions and the stop may be pivoted clear of the ring so as not to limit the advance of the ring.

DETAILED DESCRIPTION

Figure 1:
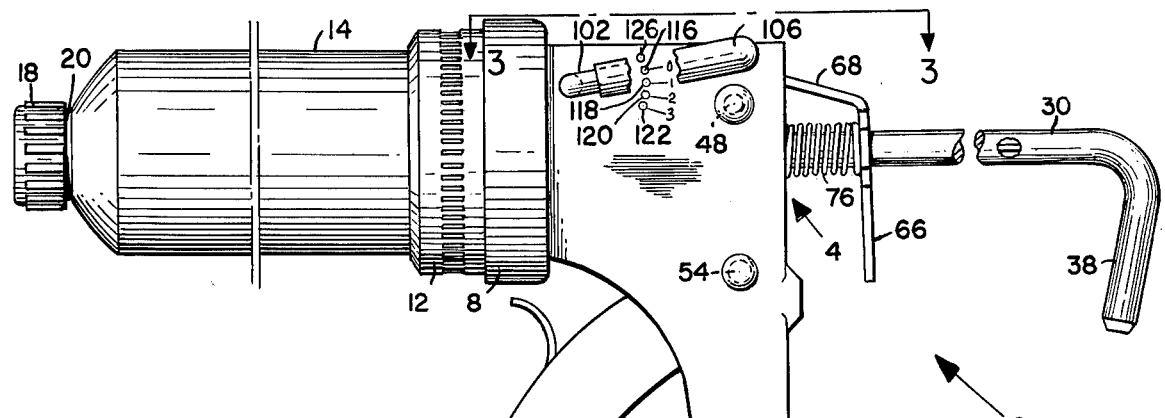
FIG. 1 is a side elevation of a multiple dose paste dispenser in accordance with the invention.
Figure 3:
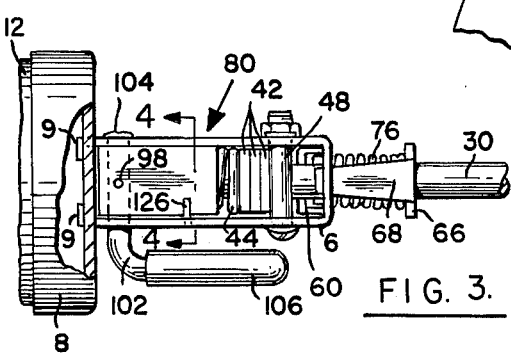
FIG. 3 is a top plan view, partially broken away, of the dispenser of FIG. 1.
Figure 2:
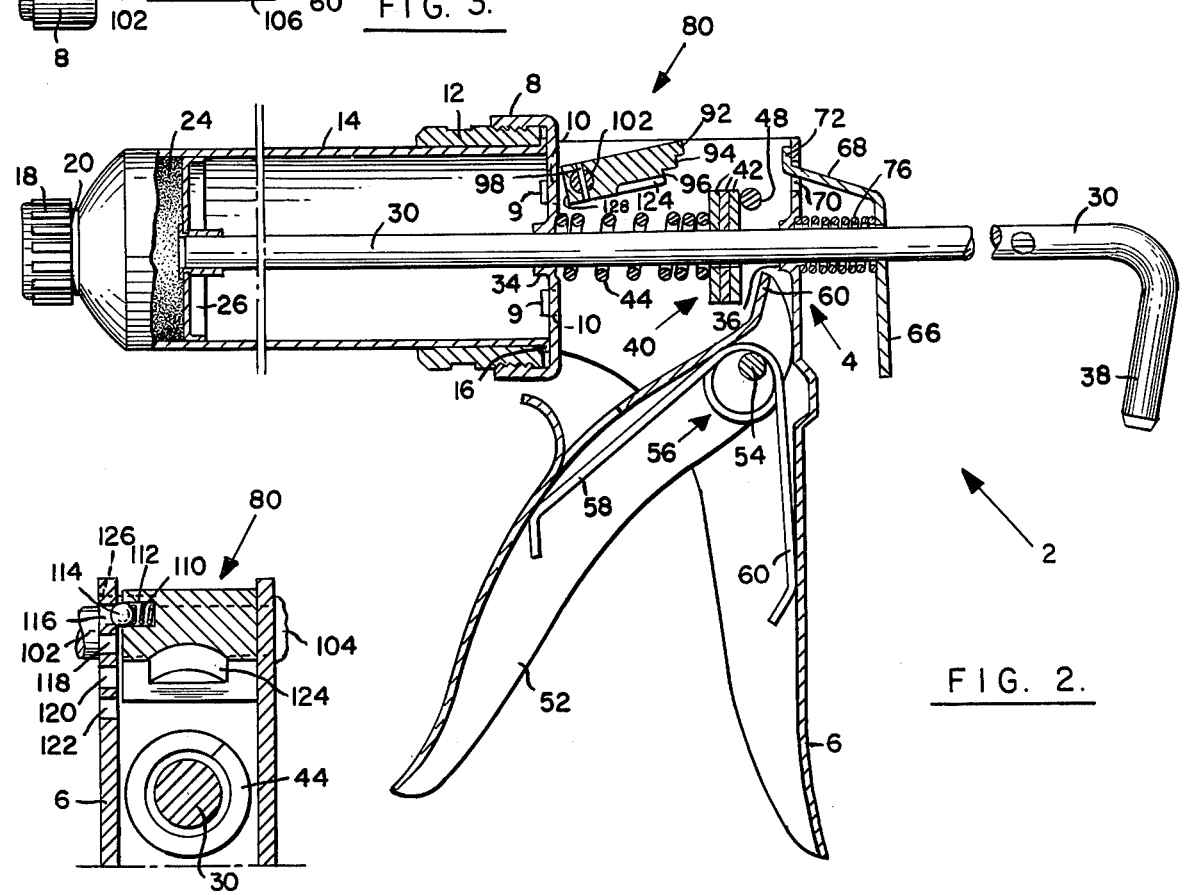
FIG. 2 is a vertical section of the dispenser of FIG. 1.
Figure 4:
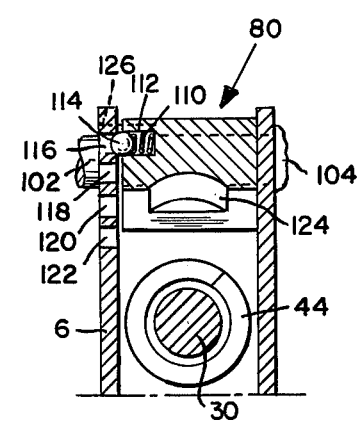
FIG. 4 is a vertical section, partially broken away, taken on the plane indicated by the line 4—4 in FIG. 3.

A multiple dose paste dispenser 2 has a frame 4 with an extension handle portion 6. A threaded cap portion 8 is held to frame 4 by tongues 9 passing through openings 10 in frame 4. A ring 12 is threadably secured to cap portion 8 to retain a cartridge 14 which is provided with a flange 16 engaged by ring 12. A threaded cap 18 is secured to a reduced discharge end 20 of cartridge 14 to retain therein a paste 24 until it is desired to discharge a dose of the paste. Cartridge 24 is secured over a piston 26 secured to a piston rod 30 which is supported for longitudinal movement by a bearing 34 in cap portion 8 and a bearing 36 in frame 4. A gripping ring 40 having three leaves 42 is loosely mounted on rod 30 and urged away from piston 26 by a compression coil spring 44 which also abuts against cap portion 8. Spring 44 urges ring 40 against a stop pin 48 mounted in frame 4. A trigger 52 is pivotally mounted on a pin 54 secured to frame 4 and has an upper end 60 above pin 54 which is adapted to engage gripping ring 40 to tilt it into gripping engagement with piston rod 30 and advance the rod 30 and piston 26 into cartridge 14. Trigger 52 is urged to its retracted position by a torsion spring 56 having a leg 58 bearing against the inside of trigger 52 and a leg 60 bearing against depending handle portion 6. A gripping lever 66 has an angled portion 68 which passes through an opening 70 in frame 4 and an upstanding upper portion 72 to provide for the tilting of lever 66 when it is acting under the force of a compression coil spring 76 which engages lever 66 and frame 4.

As thus described the paste dispenser 2 is old in the art as seen from U.S. Pat. No. 3,894,663 and hence need not be more fully detailed.

A stop 80 has spaced abutments 92, 94 and 96. Stop 80 is secured by a pin 98 to shaft 102 mounted for rotation in frame 4 and headed as shown at 104 on the outside of frame 4. Shaft 102 has a handle portion 106 for the rotation of shaft 102 and stop 80. Stop 80 abuts frame 104 on the other side thereof from headed portion 104 of shaft 102 to prevent axial movement of shaft 102. A compression spring 110 in opening 112 in stop 80 biases outwardly a detent ball 114 which is adapted to be received in a plurality of detent openings 116, 118, 120 and 122 which are positioned to provide for, respectively, the stop to be inoperative and the engagement of abutments 92, 94 and 96 by gripping ring 40. With detent ball 114 in opening 116, gripping ring 40 can be advanced until trigger 52 is squeezed against handle portion 6 of frame 4 without interference by stop 80. A pin 126 prevents the rotation of shaft 102 counterclockwise as viewed in FIG. 1 beyond the point where detent ball 114 is in opening 116. The bottom of stop 80 has a cut away portion 124 to provide for clearance of spring 44 when detent ball 114 is in opening 122 at which point the front 128 of stop 80 abuts against frame 4 to prevent further rotation of shaft 102 clockwise as viewed in FIG. 1.

DESCRIPTION OF OPERATION

The paste dispenser 2 is operated by squeezing trigger 52 to tilt gripping ring 40 and advance it carrying along piston rod 30 and piston 26 after cap 18 has been removed and, if desired, an extension fitting (not shown) attached to the cartridge. If the maximum dose is desired, detent ball 114 will be placed in opening 116 rendering stop 80 inoperative. On the other hand, rotating stop 80 clockwise as seen in FIG. 1 will decrease the dose an amount depending on the opening selected for the detent ball 114 which determines which of the abutments 92, 94 or 96 will be engaged by the forward end of gripping ring 40 to stop its forward progress. After each dose, the trigger 52 is released and spring 44 returns gripping ring 40 to a position against stop 48 with lever 66 preventing the rearward movement of piston rod 30. When the cartridge 14 is emptied, the retraction of rod 30 is accomplished by pulling on handle portion 38 while pushing the lower portion of lever 66 forwardly to release its lock on piston rod 30.

It will be understood that the above described embodiment is illustrative and not limiting.

We claim:

1. In a multiple dose paste dispenser comprising a piston rod having a piston on the front end thereof, means in said frame for guiding said piston rod, means for securing a cartridge to the frame in alignment with said piston, a gripping ring mounted on said rod, a coil return spring concentric with the piston rod and arranged to engage one side of said ring to urge it in non-tilted orientation in one direction along the rod, means for limiting the movement of said ring in said one direction, and a trigger mounted on the frame for engagement with the opposite side of said ring to advance it in tilted orientation in the opposite direction to advance the piston in the cartridge, the improvement comprising:

a stepped stop pivoted to the frame on a horizontal axis transverse to the axis of the piston rod for movement to a plurality of positions to provide for a plurality of stop positions limiting the advance of the ring.

2. A dispenser in accordance with claim 1 in which the stop is mounted for pivoting to an inoperative position.

3. A dispenser in accordance with claim 1 having detent means to hold the stop at each stop position.

4. A dispenser in accordance with claim 1 having stop means to limit the pivoting of the stop.

5. A dispenser in accordance with claim 1 in which the stop is mounted for pivoting to an inoperative position, has detent means to hold the stop at each stop position and has stop means to limit the pivoting of the stop.

* * * * *